（12）United States Patent
Lee

(10) Patent No.: US 9,120,294 B2
(45) Date of Patent: Sep. 1, 2015

(54) BIAXIALLY ORIENTED POLYPROPYLENE FILM WITH HIGH HEAT SEAL STRENGTH

(75) Inventor: Mark S. Lee, North Kingstown, RI (US)

(73) Assignee: TORAY PLASTICS (AMERICA), INC., N. Kingstown, RI (US)

( * ) Notice: Subject to any disclaimer, the term of this patent is extended or adjusted under 35 U.S.C. 154(b) by 0 days.

(21) Appl. No.: 12/240,350

(22) Filed: Sep. 29, 2008

(65) Prior Publication Data

US 2009/0087648 A1    Apr. 2, 2009

Related U.S. Application Data

(60) Provisional application No. 60/976,203, filed on Sep. 28, 2007.

(51) Int. Cl.
| | |
|---|---|
| *B32B 5/00* | (2006.01) |
| *B32B 33/00* | (2006.01) |
| *B29C 47/00* | (2006.01) |
| *B32B 27/16* | (2006.01) |

(Continued)

(52) U.S. Cl.
CPC ............. *B32B 27/16* (2013.01); *B32B 15/085* (2013.01); *B32B 27/08* (2013.01); *B32B 27/32* (2013.01); *B32B 27/327* (2013.01); *B29C 47/0021* (2013.01); *B29C 47/06* (2013.01); *B29K 2021/00* (2013.01); *B29K 2023/06* (2013.01); *B29K 2023/12* (2013.01); *B29K 2105/256* (2013.01); *B32B 37/153* (2013.01); *B32B 38/0008* (2013.01); *B32B 2038/0028* (2013.01); *B32B 2038/0092* (2013.01); *B32B 2270/00* (2013.01); *B32B 2274/00* (2013.01); *B32B 2307/518* (2013.01); *B32B 2310/14* (2013.01); *B32B 2553/00* (2013.01); *Y10T 428/265* (2015.01); *Y10T 428/2826* (2015.01)

(58) Field of Classification Search
USPC .................................................. 428/515, 516
See application file for complete search history.

(56) References Cited

U.S. PATENT DOCUMENTS

| | | | | | |
|---|---|---|---|---|---|
| 4,533,509 | A | * | 8/1985 | Gust et al. ................. | 264/173.19 |
| 5,152,946 | A | * | 10/1992 | Gillette .......................... | 264/230 |

(Continued)

FOREIGN PATENT DOCUMENTS

| | | |
|---|---|---|
| EP | 1 614 699 | 1/2006 |
| WO | WO-2004/060670 | 7/2004 |

(Continued)

OTHER PUBLICATIONS http://msdssearch.dow.com/PublishedLiteratureDOWCOM/dh_00b4/0901b803800b4d93.pdf?filepath=versify/pdfs/noreg/746-03001.pdf&fromPage=GetDoc., Feb. 2007.*

(Continued)

*Primary Examiner* — Ronak Patel
(74) *Attorney, Agent, or Firm* — Morrison & Foerster LLP

(57) ABSTRACT

A laminate film including a first polyolefin heat sealable resin layer and a second core layer including of a blend of 5-15 wt % of a metallocene-catalyzed butene-propylene or ethylene-propylene thermoplastic elastomer or ethylene-propylene plastomer or blends thereof which exhibit an isothermal crystallization temperature of 60° C. or less and 95-85 wt % of a crystalline propylene homopolymer is disclosed. The laminate film may include additional layers such as a third polyolefin resin-containing layer disposed on the side of the core layer opposite the heat sealable layer, a metal layer, or combinations thereof.

7 Claims, 4 Drawing Sheets

(51) Int. Cl.
*B32B 27/08* (2006.01)
*B32B 27/32* (2006.01)
*B32B 15/085* (2006.01)
*B29C 47/06* (2006.01)
*B29K 21/00* (2006.01)
*B29K 23/00* (2006.01)
*B29K 105/00* (2006.01)
*B32B 37/15* (2006.01)
*B32B 38/00* (2006.01)

(56) References Cited

U.S. PATENT DOCUMENTS

| | | | |
|---|---|---|---|
| 5,376,437 | A | 12/1994 | Kawakami et al. |
| 5,527,608 | A | 6/1996 | Kemp-Patchett et al. |
| 5,691,043 | A | 11/1997 | Keller et al. |
| 5,817,412 | A | 10/1998 | Lohmann et al. |
| 5,888,648 | A | 3/1999 | Donovan et al. |
| 6,033,786 | A * | 3/2000 | Fatica et al. ............ 428/461 |
| 6,303,233 | B1 | 10/2001 | Amon et al. |
| 6,326,068 | B1 | 12/2001 | Kong et al. |
| 6,514,625 | B1 * | 2/2003 | DeMeuse ............ 428/516 |
| 2002/0164470 | A1 | 11/2002 | Bader |
| 2002/0187326 | A1 * | 12/2002 | Kong ............ 428/220 |
| 2003/0148119 | A1 * | 8/2003 | Su et al. ............ 428/457 |
| 2003/0207137 | A1 * | 11/2003 | Kong et al. ............ 428/515 |
| 2005/0147835 | A1 * | 7/2005 | Chang et al. ............ 428/461 |
| 2006/0199907 | A1 | 9/2006 | Chang et al. |
| 2007/0287348 | A1 * | 12/2007 | Autran et al. ............ 442/327 |
| 2008/0064805 | A1 * | 3/2008 | Uosaki et al. ............ 524/487 |
| 2009/0068486 | A1 * | 3/2009 | Blackwell et al. ............ 428/516 |
| 2009/0081474 | A1 * | 3/2009 | Keung ............ 428/516 |
| 2009/0166911 | A1 * | 7/2009 | Uosaki et al. ............ 264/299 |

FOREIGN PATENT DOCUMENTS

| | | | |
|---|---|---|---|
| WO | WO 2006/071826 | * | 7/2006 |
| WO | WO-2007/043188 | | 4/2007 |

OTHER PUBLICATIONS http://msdssearch.dow.com/PublishedLiteratureDOWCOM/dh_004e/0901b8038004e348.pdf?filepath=versify/pdfs/noreg/746-05501.pdf&fromPage=GetDoc, Feb. 2007.*
http://catalog.ides.com/docselect.aspx?l=68651&E=84310&DOC=DOWTDS&DS=123&DK=STD&DC=en.*
International Search Report and Written Opinion, mailed Dec. 2, 2008, directed to counterpart International Patent Application No. PCT/US08/78119; 10 pages.
Notice of Opposition mailed Oct. 1, 2014, directed to EP Patent No. 2 195 161; 7 pages.

* cited by examiner

BIAXIALLY ORIENTED POLYPROPYLENE FILM WITH HIGH HEAT SEAL STRENGTH

CROSS-REFERENCE TO RELATED APPLICATION

This application claims the benefit of U.S. Provisional Application Ser. No. 60/976,203, filed Sep. 28, 2007, the contents of which are incorporated herein by reference in their entirety.

FIELD OF INVENTION

This invention relates to a multi-layer biaxially oriented polypropylene (BOPP) film which exhibits excellent sealability in terms of high seal strength and low seal initiation.

BACKGROUND OF INVENTION

Biaxially oriented polypropylene (BOPP) films used for packaging, decorative, and label applications often perform multiple functions. For example, in laminations they can provide printability, transparent or matte appearance, and/or slip properties. They can further be used to provide a surface suitable for receiving organic or inorganic coatings for gas and moisture barrier properties. They can also be used to provide a heat sealable layer for bag forming and sealing, or a layer that is suitable for receiving an adhesive either by coating or laminating.

For some applications of BOPP films, it is desirable to have very high heat seal strength and/or very high hermetic seal strength. Some snack food packages can be subjected to high altitudes during transportation (known as "Over the Mountain" in some packaging parlance) whereupon the gas-filled packages can expand due to the lower ambient air pressure, stressing the sealed areas greatly, and consequently bursting. In addition, in many snack food packaging applications in Southeast Asia, packages can be subjected to much abuse during shipping and handling; couple this with the consumer perception that highly inflated bags ("pillow packs") are viewed as a higher quality package, then the snack food package for this region often requires extremely strong seals to withstand high gas pressure inside the bag.

U.S. Pat. No. 5,888,648 describes a multi-layer film composite structure for providing hermetic seals in packages. The structure of the film includes a substrate layer and a sealant layer wherein the sealant layer itself includes two layers: an intermediate layer and a sealing layer wherein the intermediate layer is of a different composition than the sealing layer. A large variety of materials are contemplated for the intermediate layer such as LDPE (low density polyethylene), LLDPE (linear low density polyethylene), EPB (ethylene-propylene-butene) terpolymer, EP (ethylene-propylene) copolymer, plastomers, or blends thereof. Such a structure provides high heat seal strengths and hermetic seals, but the structure can be expensive due to the use of a thick intermediate layer (5-9 µm) in conjunction with a thinner sealant layer (ca. 1.5 µm) and also requires the use of an in-line extrusion coater in conjunction with 3-layer coextrusion of the film.

U.S. Pat. No. 5,376,437 describes a 3-layer film design with superior sealability and burst strength for packaging bags. The multi-layer film relies upon a "cushion" layer combined with the sealant layer, somewhat similar in function to the "intermediate layer" of U.S. Pat. No. 5,888,648. A key property for the cushion and sealant layer is the respective degree of surface orientation of each layer. The cushion layer should have a lower degree of surface orientation than the sealant layer by a specified amount. EPB terpolymer and EMMA (ethylene-methyl methacrylate-maleic anhydride terpolymer) are contemplated in the examples as suitable for the cushion layer and are also relatively thick (3-5 µm). The sealant layer is also relatively thick (>2 µm). Moreover, the use of Laser Raman microscopy to ensure correct surface orientation is a rather cumbersome and sophisticated technique to use for routine quality control.

U.S. Pat. No. 6,326,068 describes a 4-layer multi-layer film for hermetic sealing via use of a thick intermediate layer (3-15 µm) for providing compliance during sealing, and a thinner heat sealable layer (ca. 1 µm) for providing adhesivity. Random ethylene-propylene copolymers and ethylene-propylene-butene terpolymers are suitable for the intermediate compliance layer. However, such a film design requires 4-layer coextrusion capabilities and thick intermediate layers of expensive copolymers.

U.S. Pat. No. 5,817,412 describes a 3-layer coextruded film for low seal initiating temperature packaging films using 2 of the 3 coextruded layers for heat seal properties: an intermediate layer and a top sealant layer. The thicknesses of both these layers, however, are relatively thin compared to the other films (1.51 µm for intermediate layer; less than 0.4 µm for top sealant layer). The intermediate layer can be copolymers of ethylene, propylene, and/or butene or blends of such copolymers thereof. In particular, the example uses a non-metallocene-catalyzed propylene-butene copolymer Tafmer® XR110T as the intermediate layer. However, although this reference demonstrates low seal initiation and good processability, its ultimate heat seal strength and hermetic properties do not seem to be that impressive. The use of expensive copolymers such as Tafmer® XR110T as the sole component of the intermediate layer renders such a film design expensive.

U.S. Pat. No. 5,527,608 describes a 4-layer heat sealable film suitable for metallizing which exhibits high heat seal strength and hermeticity. The invention describes a "dual core" layer including a polypropylene layer and an ethylene-propylene block copolymer layer. The EP block copolymer layer is a very thick layer (8 µm), being nearly half the thickness of the overall substrate. A thick heat sealable layer (ca. 4 µm) is coextruded onto the EP block copolymer side and an optional fourth layer of HDPE (high density polyethylene) is coextruded on the polypropylene side as a metal adhesion skin layer. In essence, the EP block copolymer portion of the "dual core layer" acts like the intermediate or cushion layers mentioned in the other art references, and in this case, combined with a relatively thick heat seal layer, provides for high heat seal strengths and hermetic seals. However, this film can be expensive to produce based on the thick layers of EP block copolymer and heat sealant resin as well as possible 4-layer coextrusion equipment being required.

US Patent application 20020164470 describes a 2-layer hermetically sealable film for packages which includes a base layer with a softening additive and a coextruded heat sealable layer. The heat sealable layer includes a polypropylene copolymer with ethylene and/or butene. The base layer is polypropylene combined with a "softening additive" which can consist of ethylene-propylene copolymers, ethylene-propylene-butene terpolymers, and hydrocarbon resins, with cyclopentadiene-based hydrocarbon resin being preferred. This additive serves to make the base layer a "compliant" layer for heat sealability improvement. This film provides exceptional improvement in heat seal strength and hermeticity. However, a very thick sealant layer (3-15 µm) must be used in conjunction with the softening additive and it has been found by the inventor of the present invention that hydrocarbon resins and conventional propylene-based copolymers are not sufficient in enhancing seal strengths significantly especially with relatively thin sealant layers (e.g. ≤2 μm).

SUMMARY OF THE INVENTION

The inventor seeks to address the above issues of making high seal strength and hermetic sealing oriented polypropylene-based films in a cost-effective manner with good processability and without requiring in-line extrusion coating or 4-layer coextrusion technology or relatively thick intermediate and/or seal layers.

An embodiment that balances the above attributes of economics, hermeticity, and heat sealability includes adding an amount of 5-10%, by weight of the polypropylene core layer, of a metallocene-catalyzed propylene-butene copolymer thermoplastic elastomer of 20-40 wt % butene. Other thermoplastic elastomers as well as plastomers may be utilized as well. These elastomers and/or platstomers may have a low isothermal crystallization temperature as determined by DSC (differential scanning calorimetry).

A low isothermal crystallization temperature of 60° C. or less appears to be highly effective in enhancing heat seal properties. Polymeric materials with an isothermal crystallization temperature of higher than 60° C. do not seem to be as effective. The sealable layer used in conjunction with the modified core layer need not be a relatively thick layer, but can be of a typical conventional thickness of not more than 2 μm (8 G) or less and yet can achieve surprisingly high seal strengths compared to unmodified core versions.

An embodiment of a multi-layer laminate film may include a first layer of a heat sealable resin including conventional non-elastomeric, non-plastomeric ethylene-propylene-butene copolymer or ethylene-propylene copolymer and a second layer including a polyolefin resin-containing blend on one side of the sealable layer. This second polyolefin resin-containing blend layer may be considered a core or base layer to provide the bulk strength of the laminate film.

Furthermore, the laminate may further include a third polyolefin resin-containing layer on the second polyolefin resin-containing core layer opposite the side with the sealable layer for use as a printing layer or metal receiving layer or coating receiving layer. The first sealable layer of this laminate may include ethylene-propylene-butene copolymer, an ethylene-propylene copolymer, or blends thereof.

The second polyolefin core layer may include a blend of crystalline propylene homopolymer combined with an amount of metallocene-catalyzed propylene-butene elastomer or ethylene-propylene elastomer or ethylene-propylene plastomer, or blends thereof, that provides excellent heat sealable properties, hermetic seal properties, and improved puncture resistance.

Preferably, the second polyolefin resin-containing core layer includes a propylene homopolymer or propylene-ethylene copolymer. More preferable is a crystalline isotactic propylene homopolymer or a crystalline "mini-random" ethylene-propylene copolymer in which the ethylene content is less than 1 wt % of the polymer (also known as a "mini-random propylene homopolymer"), generally of a $C^{13}$ NMR isotactic pentad index of 90-95%, to act as the core or base layer of the laminate film.

If increased stiffness is desired for this film, a high crystalline content isotactic propylene homopolymer may be employed, such as one with a $C^{13}$ NMR isotactic pentad index of 95% or more. This core polyolefin resin-containing layer can also include an antiblock component, for example, amorphous silicas, aluminosilicates, sodium calcium aluminum silicates, crosslinked silicone polymers, and polymethylmethacrylates to aid in machinability and winding.

Further stiffness can be obtained by incorporating into the core polyolefin layer modifiers or additives such as hydrocarbon resins or fine mineral fillers that do not substantially affect the overall appearance or transparency of the laminate structure.

The second polyolefin resin-containing core layer may also include an amount of ethylene-propylene or propylene-butene elastomer, preferably metallocene-catalyzed, or ethylene-propylene plastomer, or blends thereof, as a minority component, generally 15 wt % or less of the core layer, and preferably about 5-10 wt % of the core.

Preferably, the optional third polyolefin resin-containing layer includes a polyolefin selected from propylene homopolymer, copolymers, terpolymers, polyethylene and combinations thereof. This third polyolefin resin-containing layer can also include an antiblock component, for example, amorphous silicas, aluminosilicates, sodium calcium aluminum silicates, crosslinked silicone polymers, and polymethylmethacrylates to aid in machinability and winding. Preferably, the third polyolefin layer is a discharge-treated layer having a surface for lamination, metallizing, printing, or coating with adhesives or inks.

For these multi-layer film structures described above, it is preferable to discharge-treat the side of this multi-layer film structure opposite the heat sealable first layer for lamination, metallizing, printing, or coating, while leaving the heat sealable first layer side untreated in order to maintain heat sealing properties. Discharge-treating the heat sealable layer may be undesirable as it can result in the treated side having a narrower seal range due to crosslinking of the ethylene and/or butene constituents of the copolymers used. Thus, the functional side of the heat seal layer should be left untreated in order to obtain the full and useful heat seal range.

In the case of a 2-layer laminate structure wherein the sealable layer is contiguous with a polyolefin core layer, it is preferable to discharge-treat the side of the core layer opposite the sealable layer for purposes of laminating, printing, metallizing, coating, etc. In the case of a 3-layer laminate structure, it is preferable to discharge-treat the side of the third layer which is contiguous to the side of the core layer opposite the heat sealable first layer. This third layer, as mentioned previously, is often formulated with materials that are conducive to receiving printing inks, metallizing, adhesives, or coatings.

Discharge-treatment in the above embodiments can be accomplished by one of several techniques, including but not limited to corona, flame, plasma, or corona in a controlled atmosphere of selected gases. Preferably, in one variation, the discharge-treated surface has a corona discharge-treated surface formed in an atmosphere of $CO_2$ and $N_2$ to the exclusion of $O_2$. The laminate film embodiments could further include a vacuum-deposited metal layer on the discharge-treated layer's surface. Preferably, the metal layer has a thickness of about 5 to 100 nm, has an optical density of about 1.5 to 5.0, and includes aluminum. In one variation, the laminate film is an extruded laminate film.

Preferably, the laminate film is produced via coextrusion of the heat sealable layer and the blended core layer and other layers if desired, through a compositing die whereupon the molten multilayer film structure is quenched upon a chilled casting roll system or casting roll and water bath system and subsequently oriented in the machine and/or transverse direction into an oriented multi-layer film.

The films may also be metallized via vapor-deposition, preferably a vapor-deposited aluminum layer, with an optical density of at least about 1.5, preferably with an optical density of about 2.0 to 4.0, and even more preferably between 2.3 and 3.2. Optionally, an additional third layer specifically formulated for metallizing to provide adequate metal adhesion, metal gloss, and gas barrier properties can be disposed on the second polyolefin resin-containing core layer, opposite the side with the heat sealable layer. Additionally, this additional layer's surface may also be modified with a discharge treatment to make it suitable for metallizing, laminating, printing, or converter applied adhesives or other coatings.

Additional advantages of this invention will become readily apparent to those skilled in the art from the following detailed description, wherein only the preferred embodiments of this invention are shown and described, simply by way of illustration of the best mode contemplated for carrying out this invention. As will be realized, this invention is capable of other and different embodiments, and its details are capable of modifications in various obvious respects, all without departing from this invention. Accordingly, the examples and description are to be regarded as illustrative in nature and not as restrictive.

Figure 2A:
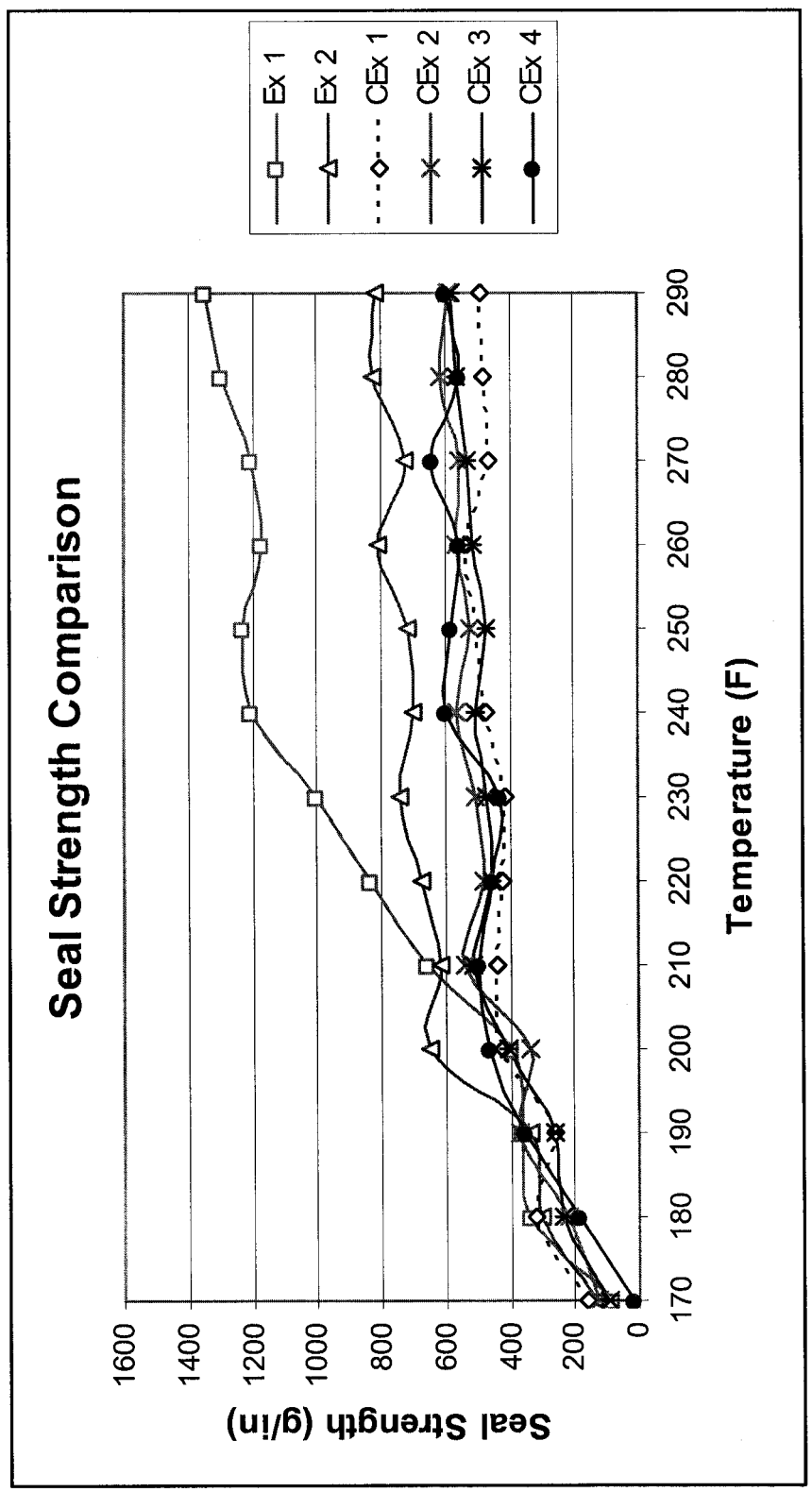
FIG. 2A shows seal strength comparisons over a range of sealing temperatures between only Examples 1 and 2 and the Comparative Examples for clarity.
Figure 2B:
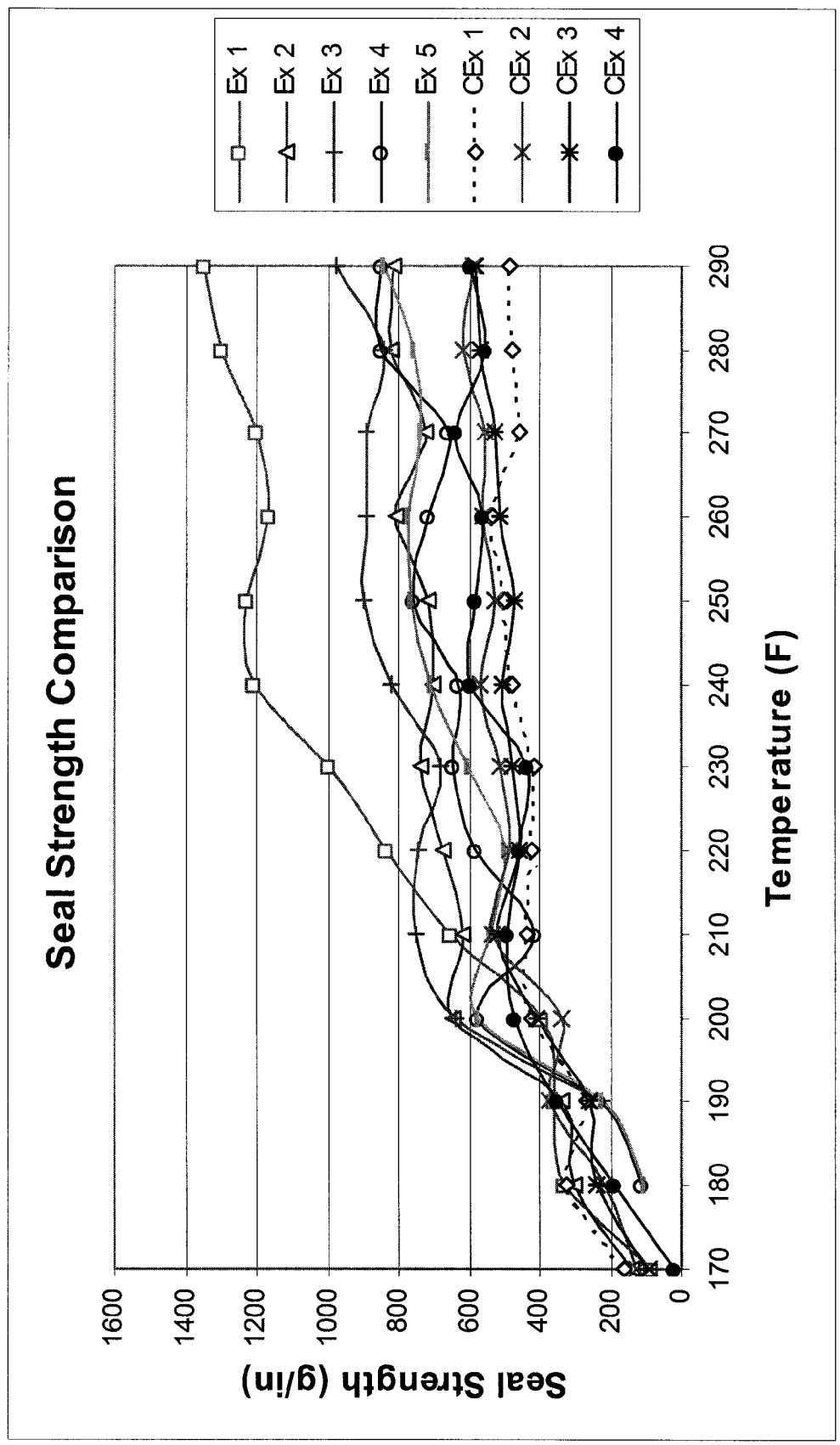

The other Examples 3-5 show similar improvement as Example 2 as shown in FIG. 2B.

Figure 3:
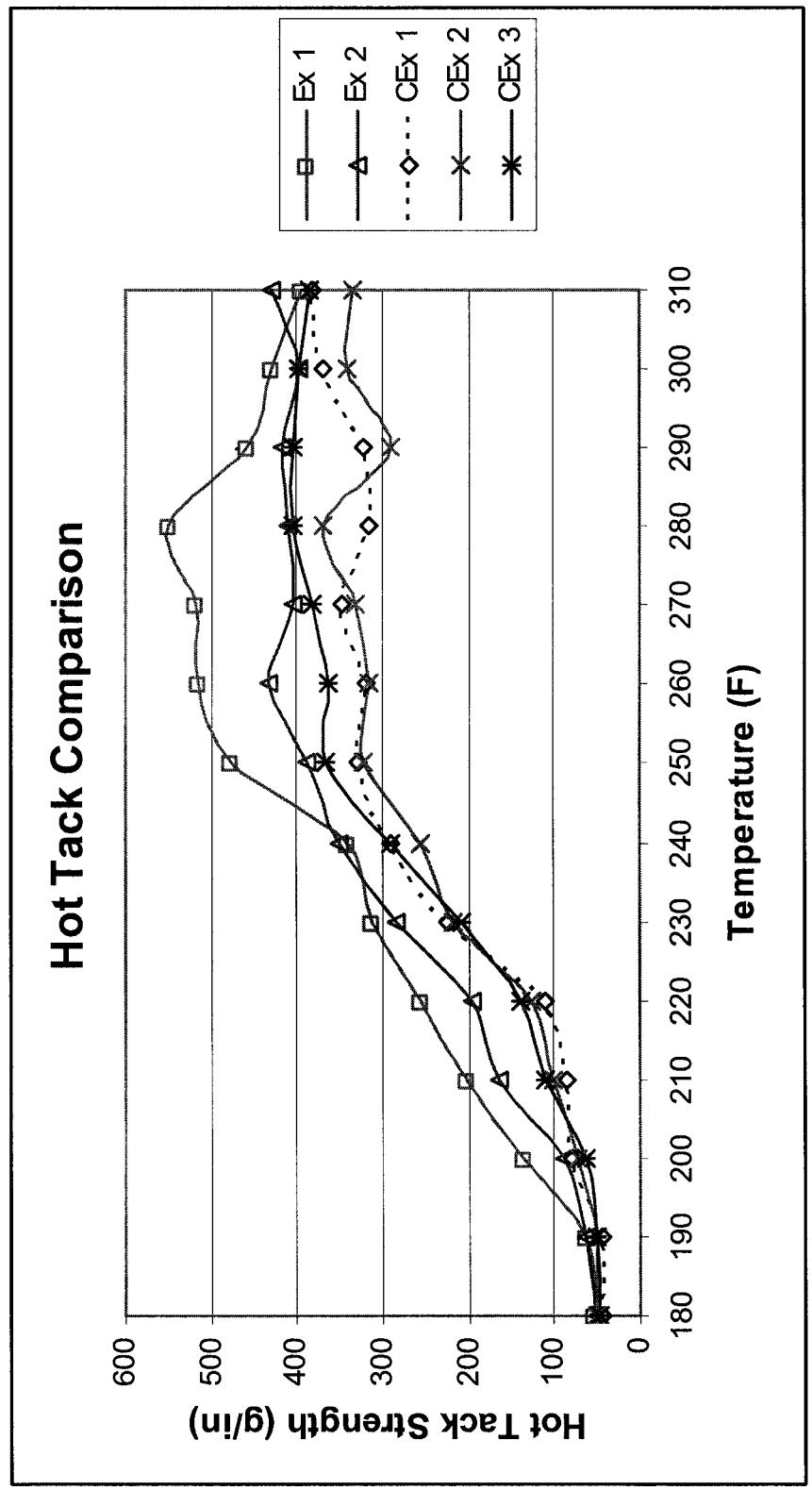

FIG. 3 shows hot tack strength comparisons between some of the Examples and Comparative Examples.

DETAILED DESCRIPTION OF THE INVENTION

This invention relates to a multi-layer biaxially oriented polypropylene (BOPP) film which exhibits excellent sealability in terms of high seal strength and low seal initiation. This high heat seal formulation combines a heat sealable skin layer of conventional and commercially available heat sealant resins coextruded with a core layer formulation of crystalline propylene homopolymer blended with a minority amount of low molecular weight thermoplastic elastomer or plastomer which exhibits a low isothermal crystallization temperature of 60° C. or less. Such a coextruded film layer formulation results in excellent heat seal properties with unexpectedly high heat seal strengths. This film also exhibits improved puncture resistance properties.

High strength, hermetic heat seals may be obtained without the use of exotic resins and polymers, very thick sealant layers, or additional capital such as multiple layer coextruders (e.g. 4 or more coextruders for 4-layer or more coextruded film structures) and dies or in-line extrusion coating equipment.

One embodiment of the laminate film may include a 2-layer coextruded film of: a mixed polyolefin resin core layer including a crystalline isotactic propylene homopolymer or crystalline mini-random ethylene-propylene copolymer mixed with an amount of an amorphous metallocene-catalyzed propylene-butene thermoplastic elastomer, an ethylene-propylene thermoplastic elastomer, an ethylene-propylene plastomer, or blends thereof; and a heat sealable non-elastomeric, non-plastomeric ethylene-propylene-butene copolymer or ethylene-propylene copolymer (or blends thereof) layer disposed on one side of the mixed resin core layer; and the side of the isotactic propylene homopolymer/ elastomer or plastomer-blended core layer opposite the sealable resin layer is discharge-treated.

Another embodiment of the laminate film may include a similar construction as above, except that the core polyolefin resin layer includes a high crystalline propylene homopolymer resin optionally blended with an amount of a hydrocarbon resin as a processing aid in addition to the thermoplastic elastomer or plastomer additive resin.

The polypropylene resin core layer may be a crystalline polypropylene of specific isotactic content and can be uniaxially or biaxially oriented. The crystalline polypropylene may be a propylene homopolymer or a mini-random ethylene-propylene copolymer with a fractional ethylene content of less than 1 wt % of the polymer (preferably about 0.5-0.6 wt %). Crystalline polypropylenes and mini-random propylene copolymers are generally described as having an isotactic content of about 90% or greater as measured by $C^{13}$ NMR isotactic pentad index. Suitable examples of crystalline polypropylenes include Total 3271 and ExxonMobil PP4772. These resins also have melt flow rates of about 1.6 g/10 min, a melting point of about 157.3° C., a crystallization temperature of about 108-126° C., a heat of fusion of about 98.2 J/g, a heat of crystallization of about 105-111 J/g, a $C^{13}$ NMR isotactic pentad ratio of about 93%, a % heptane insolubles of about 95-96%, and a density of about 0.90-0.91.

The core resin layer may be 8 μm to 100 μm in thickness after biaxial orientation, preferably between 10 μm and 50 μm, and more preferably between about 12 μm and 20 μm in thickness. A preferred embodiment is to use high crystalline propylene homopolymer such as Total 3270 to provide a higher modulus film and consequently, a stiffer film. This resin typically has an isotactic index of greater than 95%, preferably 98%, as measured by $C^{13}$ NMR isotactic pentad ratio, and % heptane insolubles of 97% or greater, melt flow rate of nominal 2.0 g/10 minutes at 230° C., melting point of 163-167° C., a crystallization temperature of about 108-126° C., a heat of fusion of about 86-110 J/g, a heat of crystallization of about 105-111 J/g, and a density of about 0.91.

The core layer may also optionally include an amount of hydrocarbon resin additive to further improve stiffness and provide some moisture barrier improvement. A preferred embodiment combines a minor amount of the hydrocarbon resin with a high crystalline propylene homopolymer, to produce a satisfactorily stiff BOPP film that is roughly 10% higher modulus and stiffness than an equivalent film made with a conventional crystallinity propylene homopolymer alone.

The hydrocarbon resin also acts as a processing aid during biaxial orientation of the film by allowing a wider processing window in terms of stretching temperatures and motor torques for machine direction (MD) and particularly, transverse direction (TD) stretching, particularly when using a high crystalline propylene homopolymer. A suitable hydrocarbon resin is of the dicyclopentadiene type available in masterbatch form from ExxonMobil as PA609A or PA610A, which are 50 wt % masterbatches of polypropylene carrier resin and 50 wt % dicyclopentadiene. Suitable amounts of hydrocarbon masterbatch may include concentrations of up to 20 wt % of the core layer (i.e. up to 10 wt % active hydrocarbon resin component). Preferably, about 5-10 wt % of the hydrocarbon resin masterbatch is used in conjunction with the high crystalline propylene homopolymer.

A minority amount of thermoplastic elastomer or plastomer is blended into the core layer with the crystalline propylene homopolymer or mini-random copolymer. A thermoplastic elastomer can be described as any of a family of polymers or polymer blends (e.g. plastic and rubber mixtures)

that resemble elastomers in that they are highly resilient and can be repeatedly stretched and, upon removal of stress, return to close to its original shape; is melt-processable at an elevated temperature (uncrosslinked); and does not exhibit significant creep properties.

Thermoplastic elastomers typically have a density of between 0.860 and 0.890 g/cm³ and a molecular weight $M_w$ of 100,000 or greater. Plastomers differ from elastomers: a plastomer can be defined as any of a family of ethylene-based copolymers (i.e. ethylene alpha-olefin copolymer) that has properties generally intermediate to those of thermoplastic materials and elastomeric materials (thus, the term "plastomer") with a density of less than about 0.900 g/cm³ (down to about 0.865 g/cm³) at a molecular weight $M_w$ between about 5000 and 50,000, typically about 20,000 to 30,000.

Plastomers generally have ethylene crystallinity between thermoplastics and ethylene alpha-olefin elastomers and are generally of a higher crystallinity than elastomers (which can generally be considered amorphous). As such, plastomers generally have better tensile properties than elastomers.

However, suitable types of thermoplastic elastomer or plastomer may be ones that exhibit an isothermal crystallinity temperature of 60° C. or less as determined by DSC. Those thermoplastic elastomers or plastomers which have an isothermal crystallinity temperature of greater than 60° C. have been found to be less efficacious in improving heat seal and hermetic properties, and puncture resistance. Moreover, conventional non-elastomeric and non-plastomeric propylene copolymers with ethylene and/or butene are similarly not suitable as their isothermal crystallinity temperatures are usually well above 60° C. Suitable thermoplastic elastomers that exhibit the proper isothermal crystallinity temperature are ones based on ethylene-propylene or propylene-butene copolymer thermoplastic elastomers or ethylene-propylene copolymer-based plastomers.

The propylene-butene random thermoplastic elastomer preferably has 20-40 wt % butene content of the elastomer and the resulting polymer is amorphous or of low crystallinity, and is of very low density compared to typical polyethylenes. Preferred propylene-butene thermoplastic elastomers are metallocene-catalyzed ones. The metallocene catalysis of such elastomers results in a narrow molecular weight distribution; typically, $M_w/M_n$ is 2.0 polydispersity. Comonomer dispersion is also narrower than in a comparable Ziegler-Natta catalyzed thermoplastic elastomer. This, in turn, results in an elastomer which provides lower seal initiation temperature and maintains high seal strength when used as a heat sealant modifier.

Suitable metallocene-catalyzed propylene-butene thermoplastic elastomer materials include those manufactured by Mitsui Chemicals under the tradename Tafmer® and grade names XM7070 and XM7080. These are propylene-butene low molecular weight, low crystallinity copolymers. XM7070 is about 26 wt % butene content; XM7080 is about 22 wt % butene. They are characterized by a melting point of 75° C. and 83° C., respectively; a Vicat softening point of 67° C. and 74° C., respectively; a density of 0.883-0.885 g/cm³; a $T_g$ of about −15° C.; a melt flow rate at 230° C. of 7.0 g/10 minutes; and a molecular weight of 190,000-192,000 g/mol. XM7070 is preferred due to its higher butene content.

The metallocene propylene-butene thermoplastic elastomers are in contrast to typical conventional non-elastomeric or non-plastomeric ethylene-propylene or propylene-butene or ethylene-propylene-butene copolymers used for heat sealant resin layers in coextruded BOPP films such as Sumitomo SPX78H8 which are long-chain, high molecular weight polymers with significantly higher molecular weights on the order of 350,000 to 400,000 g/mol. These types of high molecular weight heat sealable copolymer resins are not considered thermoplastic elastomers as they do not contain rubbery portions or exhibit rubbery or elastomeric characteristics.

Non-metallocene propylene-butene elastomers can also be used, such as Ziegler-Natta catalyzed propylene-butene elastomers such as Mitsui Tafmer® XR110T. XR110T has a butene content of about 25.6 wt % and molecular weight of about 190,185 g/mol which is similar to XM7070, but its density of 0.89 g/cm³, melting point of 110° C., and Vicat softening point of 83° C. are higher than its metallocene-catalyzed counterpart XM7070 butene-propylene elastomer. Additionally, due to the Ziegler catalyst system, the molecular weight distribution of the non-metallocene catalyzed butene-propylene elastomer XR110T is much wider than the metallocene-catalyzed butene-propylene elastomer XM7070.

Consequently, the properties and heat sealable properties of a non-metallocene-catalyzed butene-propylene elastomer may be different from a metallocene-catalyzed butene-propylene elastomer. However, for the purposes of this invention, the metallocene and non-metallocene-catalyzed versions are interchangeable so long as their isothermal crystallinity temperatures are 60° C. or less.

Other suitable metallocene-catalyzed thermoplastic elastomers that may be used include those such as ExxonMobil's Vistamaxx® 3000 grade, which is an ethylene-propylene elastomer of about 11 wt % ethylene content, 8 g/10 min MFR at 230° C., density of 0.871 g/cm³, $T_g$ of −20 to −30° C., and Vicat softening point of 64° C.

Suitable ethylene alpha-olefin copolymer plastomers are those such as Dow Chemical's Versify® 3300 grade, which is an ethylene-propylene plastomer of about 12 wt % ethylene content, 8 g/10 min MFR at 230° C., density of 0.866 g/cm³, $T_g$ of −28° C., and Vicat softening point of 29° C.

The amount of suitable thermoplastic elastomer or plastomer to be blended into the core layer may be from about 5 to 15 wt %, preferably 10 wt % of the core layer. The remainder of the core layer may include a crystalline propylene homopolymer or mini-random homopolymer of about 95 to 85 wt % of the core layer, preferably 90 wt %. Using more than 15 wt % of the modifying elastomer or plastomer in the core layer may raise the cost of such a film and also can reduce the tensile properties and stiffness of the film significantly. In this respect, it can be useful to use a high crystallinity propylene homopolymer in the core layer as discussed previously to improve further film tensile properties and off-set the loss of tensile properties when using the thermoplastic elastomer or plastomer modifiers.

Figure 1:
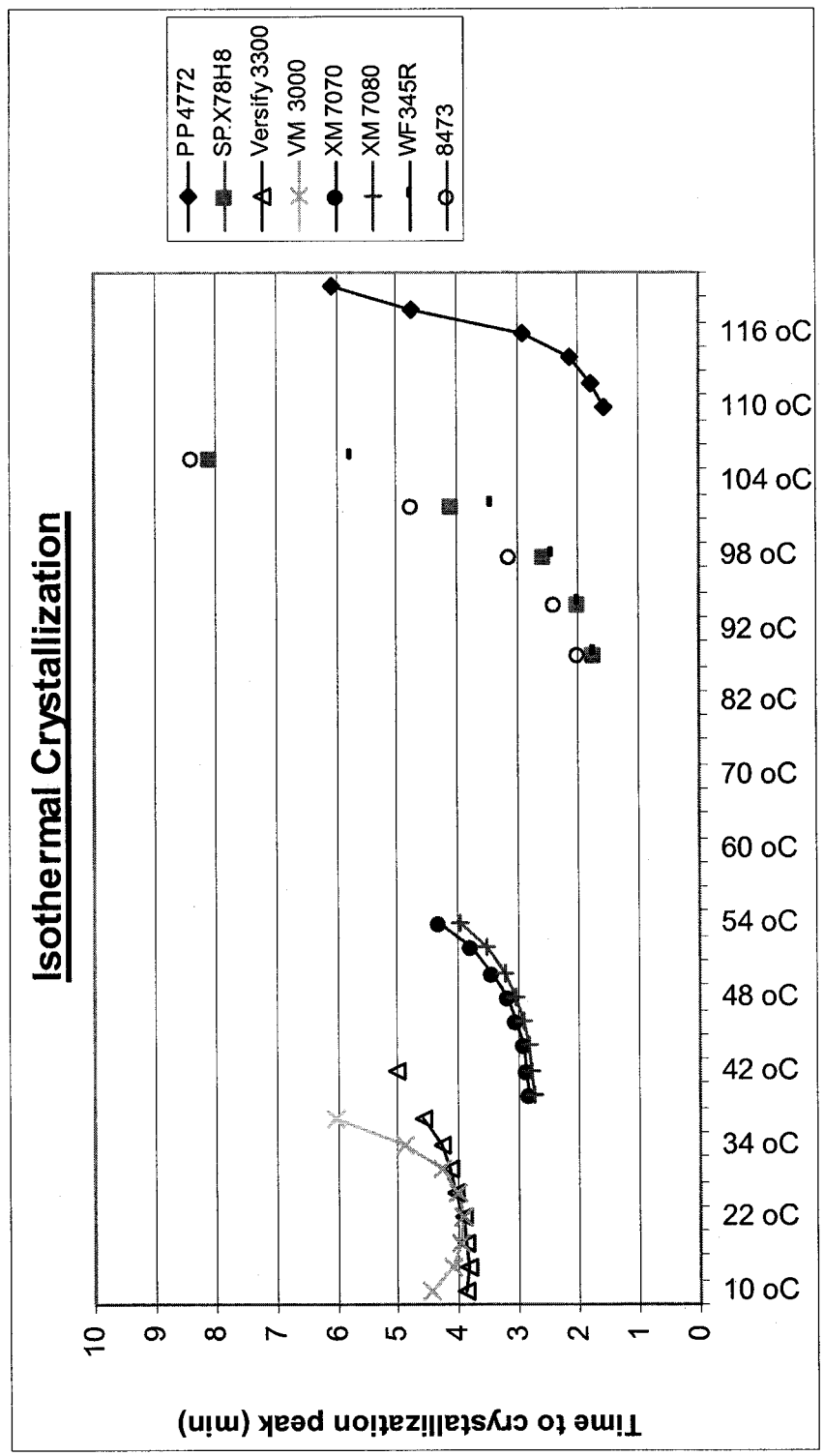
FIG. 1 compares isothermal crystallization curves for several types of polyolefins described herein.

As previously described, the thermoplastic elastomer or plastomer preferably exhibits a low isothermal crystallization temperature of 60° C. or less. FIG. 1 compares isothermal crystallization curves for several types of polyolefins described herein. Propylene mini-random homopolymer (ExxonMobil PP4772) shows the highest crystallization temperature (nominal 116° C.) which reflects its higher crystalline content and thus will crystallize the fastest in comparison to the other materials in the figure.

High molecular weight random copolymers and terpolymers of propylene, which are not elastomers nor plastomers (as shown by Sumitomo SPX78H8 ethylene-propylene-butene copolymer, Sumitomo WF345R ethylene-propylene-butene copolymer, Total 8473 ethylene-propylene copolymer), show crystallization temperatures that are lower than propylene homopolymer of about 90-98° C. This indicates that these random co- and terpolymers are slower to crystallize than propylene homopolymer as expected, since they are less crystalline and more amorphous. However, the additives of most interest exhibit very low crystallization temperatures of below 60° C.

In particular, the metallocene-catalyzed propylene-butene and ethylene-propylene-based thermoplastic elastomers (e.g. Mitsui Tafmer® XM7070, XM7080, and ExxonMobil Vistamaxx® 3000) and ethylene-propylene-based plastomers (e.g. Dow Chemical Versify® 3300,) show crystallization temperatures of about 48° C. and 30° C. respectively. These are significantly lower than even the random copolymers and indicate that these elastomers/plastomers are very low in crystallinity and highly amorphous. Without being bound by any theory, it is believed that this property helps improve the adhesive compatibility of the core layer to the sealant layer which improves the seal strength performance.

The core resin layer may be surface treated on one side with an electrical corona-discharge treatment method, flame treatment, atmospheric plasma, or corona discharge in a controlled atmosphere of nitrogen, carbon dioxide, or a mixture thereof, with oxygen excluded and its presence minimized. The latter method of corona treatment in a controlled atmosphere of a mixture of nitrogen and carbon dioxide is particularly preferred. This method results in a treated surface that includes nitrogen-bearing functional groups, preferably at least 0.3 atomic % or more, and more preferably, at least 0.5 atomic % or more. This treated core layer is then well suited for subsequent purposes of metallizing, printing, coating, or laminating.

In embodiments of a 2-layer laminate film, it is often desirable to add an amount of antiblocking agent to the core layer for aiding machinability and winding. An amount of an inorganic antiblock agent can be added in the amount of 100-1000 ppm of the core resin layer, preferably 300-600 ppm. Preferred types of antiblock are spherical sodium aluminum calcium silicates or amorphous silica of nominal 6 μm average particle diameter, but other suitable spherical inorganic antiblocks can be used including crosslinked silicone polymer or polymethylmethacrylate, and ranging in size from 2 μm to 6 μm. Migratory slip agents such as fatty amides and/or silicone oils may also be optionally employed in the core layer either with or without the inorganic antiblocking additives to aid further with controlling coefficient of friction and web handling issues.

Suitable types of fatty amides are those such as stearamide or erucamide and similar types, in amounts of 100-1000 ppm of the core. Preferably, stearamide is used at 400-600 ppm of the core layer. A suitable silicone oil that may be used is a low molecular weight oil of 350 centistokes which blooms to the surface readily at a loading of 400-600 ppm of the core layer. However, if the films are desired to be used for metallizing or high definition process printing, the use of migratory slip additives may be avoided in order to maintain metallized barrier properties and adhesion or to maintain high printing quality in terms of ink adhesion and reduced ink dot gain.

The heat sealable resin layer may include a random ethylene-propylene-butene copolymer, ethylene-propylene copolymer, propylene-butene copolymer, or ethylene-butene copolymer or blends thereof and which are not thermoplastic elastomers nor plastomers as described previously. The heat sealable resin may be of any number of commercially available resins.

Suitable heat sealable resins include those available from Sumitomo such as SPX78H8 or WF345R grades which are ethylene-propylene-butene copolymers. SPX78H8 is about 14.5 wt % butene content and 1.5 wt % ethylene content with a MFR of about 9 g/10 min at 230° C. and WF345R is about 7.2 wt % butene content and 3.3 wt % ethylene content with a MFR of about 9 g/10 min at 230° C. A suitable ethylene-propylene copolymer may be Total Petrochemical's 8473 grade, which is about 4.5 wt % ethylene content and a MFR of about 4 g/10 min at 230° C.

An amount of an inorganic antiblock agent may also be added to this layer to aid in machinability, winding, coefficient of friction control, and film handling, in the amount of 1000-5000 ppm of the heat sealable resin layer, preferably 3000-5000 ppm. Preferred types of antiblock are spherical crosslinked silicone polymer such as Toshiba Silicone's Tospearl® grades of polymethylsilsesquioxane of nominal 2.0 and 3.0 μm sizes. Alternatively, sodium aluminum calcium silicates of nominal 3 μm in diameter can also be used (such as Mizusawa Silton® JC-30), but other suitable spherical inorganic antiblocks can be used including polymethylmethacrylate, silicas, and silicates, and ranging in size from 2 μm to 6 μm.

Migratory slip agents such as fatty amides or silicone oils may also be added to the heat seal resin layer, of types and quantities mentioned previously, if lower COF is desired. However, if the films are desired to be used for metallizing or high definition process printing, it is recommended that the use of migratory slip additives be avoided or minimized in order to maintain metallized barrier properties and metal adhesion or to maintain high printing quality in terms of ink adhesion and reduced ink dot gain.

The heat sealable resin layer may be coextruded on one side of the core layer, the heat sealable layer having a thickness after biaxial orientation of between 0.5 and 5 μm, preferably between 1.0 and 2.0 μm. The core layer thickness may be of any desired thickness after biaxial orientation, but preferred are in the range of 10 μm to 100 μm, preferably 13.5 μm to 25 μm, and even more preferably 15.0 μm-18.5 μm.

The coextrusion process may include a multi-layered compositing die, such as a two- or three-layer die. In the case of a 2-layer coextruded film, a two-layer compositing die may be used. In the case of a 3-layer coextruded film, the polymer blend core layer can be sandwiched between the heat sealable resin layer and a third layer using a three-layer compositing die.

Embodiments may be coextruded in only two layers with only the blended core layer and the heat sealable layer coextruded on one side of the core layer. In this case, the core layer side opposite the heat sealable layer may be further modified by adding inorganic antiblock particles into the core layer itself and can also be surface-treated via a discharge-treatment method if so desired.

In a three-layer coextruded film embodiment, a third layer on the side of the core layer opposite the heat sealable layer may also be modified with antiblock particles in lieu of the core layer and also is surface-treated via a discharge-treatment method as desired. Selection of the third layer can be any polymer typically compatible with the core layer resin such as propylene homopolymer or copolymers with ethylene and/or butene, polyethylene, or blends thereof.

Typically, selection of this third layer's formulation is to enhance the coextruded film's printability, appearance, metallizability, winding, laminating, sealability, or other useful characteristics. Useful thickness of this third layer after biaxial orientation can be similar to the thicknesses cited for the heat sealable skin layer, namely, preferably 1.0-2.0 µm.

The surface opposite the heat sealable layer can be surface-treated if desired with a corona-discharge method, flame treatment, atmospheric plasma, or corona discharge in a controlled atmosphere of nitrogen, carbon dioxide, or a mixture thereof which excludes oxygen. The latter treatment method in a mixture of $CO_2$ and $N_2$ only is preferred. This method of discharge treatment results in a treated surface that includes nitrogen-bearing functional groups, preferably 0.3% or more nitrogen in atomic %, and more preferably 0.5% or more nitrogen in atomic %. This discharge-treated surface may then be metallized, printed, coated, or extrusion or adhesive laminated. Preferably, it is printed or metallized, and more preferably, metallized.

If a three-layer coextruded film embodiment is chosen, a third layer may be coextruded with the core layer opposite the heat sealable resin layer, having a thickness after biaxial orientation between 0.5 and 5 µm, preferably between 0.5 and 3 µm, and more preferably between 1.0 and 2.0 µm.

A suitable material for this layer is a crystalline mini-random ethylene-propylene copolymer of about 0.6 wt % ethylene content such as Total Petrochemical EOD-0437. This resin is well-suited as a metal receiving layer (after discharge-treating) providing good metal adhesion, non-metal crazing, good gas barrier properties after metallizing, and glossy appearance.

Other embodiments for this third layer composition can be contemplated, including higher ethylene content copolymers for printability, higher metal adhesion, etc. This third layer may also advantageously contain an anti-blocking agent and/or slip additives for good machinability and a low coefficient of friction in about 0.01-0.5% by weight of the third layer, preferably about 250-1000 ppm. Preferably, non-migratory inorganic slip and/or antiblock additives as described previously should be used to maintain gas barrier properties and metal adhesion if metallizing, or ink wetting and ink adhesion if printing.

The multilayer coextruded film can be made by sequential biaxial orientation or simultaneous biaxial orientation, which are well-known processes in the art. The multilayer coextruded laminate sheet may be coextruded at melt temperatures of about 240° C. to 260° C. and cast onto a cooling drum whose surface temperature is controlled between 20° C. and 60° C. to solidify the non-oriented laminate sheet.

If a sequential biaxial orientation process is used, the non-oriented laminate sheet may be stretched first in the longitudinal direction at about 99° C. to 165° C. at a stretching ratio of about 4 to about 6 times the original length, preferably about 4.0-5.0 times, using differentially heated and sped rollers and the resulting stretched sheet is cooled and heat-set on annealing rollers to obtain a uniaxially oriented laminate sheet. The uniaxially oriented laminate sheet may then be introduced into a tenter and preliminarily heated between 130° C. and 180° C., and stretched in the transverse direction at a stretching ratio of about 7 to about 12 times, preferably 8-10 times, the original length and then heat-set or annealed to reduce internal stresses due to the orientation and minimize shrinkage and give a relatively thermally stable biaxially oriented sheet.

The biaxially oriented film may have a total thickness between 10 and 100 µm, preferably between 15 and 25 µm, and most preferably between 17.5 and 20 µm. For simultaneous orientation, the machine direction and transverse direction stretching may be done simultaneously using a specially designed tenter-frame and clip and chain design which obviates the need for a machine direction orienter of driven and heated rollers.

One embodiment is to metallize the discharge-treated surface opposite the heat sealable resin layer. The unmetallized laminate sheet is first wound in a roll. The roll is placed in a vacuum metallizing chamber and the metal vapor-deposited on the discharge-treated metal receiving layer surface. The metal film may include titanium, vanadium, chromium, manganese, iron, cobalt, nickel, copper, zinc, aluminum, gold, or palladium, the preferred being aluminum.

Metal oxides can also be contemplated, the preferred being aluminum oxide. The metal layer may have a thickness between 5 and 100 nm, preferably between 20 and 80 nm, more preferably between 30 and 60 nm; and an optical density between 1.5 and 5.0, preferably between 2.0 and 4.0, more preferably between 2.2 and 3.2. The metallized film is then tested for oxygen and moisture gas permeability, optical density, metal adhesion, metal appearance and gloss, heat seal performance, puncture resistance, tensile properties, and can be made into a laminate structure.

This invention will be better understood with reference to the following examples, which are intended to illustrate specific embodiments within the overall scope of the invention.

Example 1

A 3-layer coextruded biaxially oriented film was made using sequential orientation including a core layer blend of a propylene mini-random homopolymer resin ExxonMobil PP4772 at 90 wt % of the core layer and 10 wt % of the core of Mitsui Tafmer® XM7070 metallocene-catalyzed propylene-butene thermoplastic elastomer. A heat sealable resin layer of ethylene-propylene-butene random copolymer Sumitomo SPX78H8, was coextruded on one side of the core layer, as described in the above description. This grade of resin also contained about 5000 ppm of crosslinked silicone polymer antiblock of 2.0 µm diameter.

The opposite side of the core layer from the heat sealable layer was coextruded with a propylene mini-random homopolymer Total EOD-0437 which also contained about 300 ppm of a 3.0 μm diameter sodium calcium aluminum silicate antiblock.

The total thickness of this film substrate after biaxial orientation was ca. 70 G or 0.7 mil or 17.5 μm. The thickness of the respective heat sealable resin layer after biaxial orientation was ca. 6 G (1.5 μm). The thickness of the core layer after biaxial orientation was ca. 60 G (15 μm). The third layer on the side of the core layer opposite the heat seal layer was about 4 G (1 μm) after biaxial orientation.

Both skin layers and the core layer were melt co-extruded together at nominal 450-500° F. (230-260° C.). The 3-layer co-extrudate was passed through a flat die to be cast on a chill drum of 100-140° F. (38-60° C.). The formed cast sheet was passed through a series of heated rolls at 210-270° F. (99-132° C.) with differential speeds to stretch in the machine direction (MD) at ca. 4.3× stretch ratio. This was followed by transverse direction (TD) stretching at ca. 10× stretch ratio in the tenter oven at 310-350° F. (154-177° C.) and heat-set or annealed to reduce film shrinkage effects at ca. 304-343° F. (151-173° C.). The resultant biaxially oriented film was subsequently discharge-treated on the skin layer's surface opposite the heat sealable skin layer via corona treatment in a controlled atmosphere of nitrogen and carbon dioxide to a dyne level of ca. 39-43 dyne/cm. The film was then wound up in roll form. The film was tested for heat sealability and puncture resistance properties.

Example 2

A process similar to Example 1 was repeated except that the amount of Mitsui Tafmer® XM7070 in the core layer was changed to 5 wt % of the core layer. The ExxonMobil PP4772 crystalline propylene homopolymer was correspondingly changed to 95 wt % of the core.

Example 3

A process similar to Example 1 was repeated except that Mitsui Tafmer® XM7080 was used in place of the Mitsui Tafmer® XM7070 in the core layer at 10 wt % of the core.

Example 4

A process similar to Example 1 was repeated except that Dow Chemical Versify® 3300 was used in place of the Mitsui Tafmer® XM7070 in the core layer at 10 wt % of the core.

Example 5

A process similar to Example 1 was repeated except that ExxonMobil Vistamaxx® 3000 was used in place of the Mitsui Tafmer® XM7070 in the core layer at 10 wt % of the core.

Comparative Example 1

A process similar to Example 1 was repeated except that the core layer includes 100 wt % of ExxonMobil PP4772 resin. No Mitsui Tafmer® XM7070 or other suitable thermoplastic elastomers or plastomers were used in the core layer.

Comparative Example 2

A process similar to Example 1 was repeated except that Sumitomo ethylene-propylene-butene terpolymer WF345R was used in place of the Mitsui Tafmer® XM7070 in the core layer at 10 wt % of the core.

Comparative Example 3

A process similar to Example 1 was repeated except that Total ethylene-propylene copolymer 8473 was used in place of the Mitsui Tafmer® XM7070 in the core layer at 10 wt % of the core.

Comparative Example 4

A process similar to Example 1 was repeated except that ExxonMobil hydrocarbon masterbatch PA609A was used in place of the Mitsui Tafmer® XM7070 in the core layer at 20 wt % of the core. PA609A is a 50 wt % masterbatch of low molecular weight dicyclopentadiene-based hydrocarbon resin (HCR) with 50 wt % crystalline propylene homopolymer carrier resin. Thus, at a 20 wt % loading of the PA609A masterbatch in the core layer, the active hydrocarbon resin content in the core layer is 10 wt %.

The unlaminated properties of the Examples ("Ex") and Comparative Examples ("CEx.") are shown in Tables 1, 2, and 3 and FIGS. 2A, 2B, and 3.

TABLE 1

| Sample | Core Layer Composition wt % | | | | | | | | Haze % | Heat Seal Strength @ 121° C. g/25 mm |
|---|---|---|---|---|---|---|---|---|---|---|
| | PP4772 | Tafmer® XM7070 | Tafmer® XM7080 | WF 345R | 8473 | Versify® 3300 | Vistamaxx® 3000 | PA609A (active HCR) | | |
| Ex. 1 | 90 | 10 | 0 | 0 | 0 | 0 | 0 | 0 | 1.9 | 1227 |
| Ex. 2 | 95 | 5 | 0 | 0 | 0 | 0 | 0 | 0 | 1.9 | 713 |
| Ex. 3 | 90 | 0 | 10 | 0 | 0 | 0 | 0 | 0 | 2.1 | 900 |
| Ex. 4 | 90 | 0 | 0 | 0 | 0 | 10 | 0 | 0 | 2.3 | 768 |
| Ex. 5 | 90 | 0 | 0 | 0 | 0 | 0 | 10 | 0 | 2.2 | 761 |
| CEx. 1 | 100 | 0 | 0 | 0 | 0 | 0 | 0 | 0 | 2.1 | 495 |
| CEx. 2 | 90 | 0 | 0 | 10 | 0 | 0 | 0 | 0 | 4.0 | 525 |
| CEx. 3 | 90 | 0 | 0 | 0 | 10 | 0 | 0 | 0 | 3.1 | 473 |
| CEx. 4 | 90 | 0 | 0 | 0 | 0 | 0 | 0 | 10 | 2.2 | 584 |

TABLE 2

| | Burst resistance (psi) | | |
| --- | --- | --- | --- |
| | Ex 1 10% XM7070 | CEx 1 none | % Improvement |
| | 2.28 | 1.14 | |
| | 2.36 | 1.20 | |
| Average | 2.32 | 1.17 | +98.3% |

TABLE 3

| | Puncture Resistance | | |
| --- | --- | --- | --- |
| ASTM F1306 3.2 mm hemispherical probe | Ex 1 10% XM7070 | CEx 1 none | % Improvement |
| Ave max load (gf) | 2545 | 2222 | +14.5% |
| Ave energy 50% strain (kgf-mm) | 11.3 | 7.3 | +54.8% |

As Table 1 shows, Comparative Example 1 (CEx 1), which is a control film using propylene mini-random homopolymer PP4772 at 100 wt % of the core layer and SPX78H8 EPB copolymer for sealant layer, had excellent haze appearance (2.1% haze) and moderately good heat seal property typically expected for such a structure of about 495 g/in (g/25 mm) at 250° F. (121° C.).

Comparative Example 2 (CEx 2) shows a film that uses 90 wt % propylene mini-random homopolymer PP4772 blended with 10 wt % of a conventional non-elastomeric, non-plastomeric ethylene-propylene-butene terpolymer WF345H8 in the core layer. This film showed higher haze level at 4.0% (probably due to incompatibility between the homopolymer and the terpolymer which raised internal haze) and heat seal strength property is only marginally improved compared to the control CEx 1.

Comparative Example 3 (CEx 3) shows a film that uses 90 wt % propylene mini-random homopolymer PP4772 blended with 10 wt % conventional non-elastomeric, non-polymeric ethylene-propylene copolymer 8473 in the core layer. Haze was also high at 3.1% indicating incompatibility between the homopolymer and copolymer. Heat seal property showed no improvement versus CEx 1.

Comparative Examples 2 and 3 illustrate that ethylene-propylene- and/or -butene copolymers which do not exhibit elastomeric properties or an isothermal crystallinity temperature of less than 60° C. are not very effective in improving heat seal properties of the film.

Comparative Example 4 (CEx 4) shows a film that uses 90 wt % propylene mini-random homopolymer PP4772 blended with 10 wt % dicyclopentadiene-based hydrocarbon resin (20 wt % of the masterbatch PA609A) in the core layer. Haze was good indicating good compatibility between the polypropylene and the hydrocarbon resin. Heat seal property was slightly improved over CEx 1. However, this comparative example illustrates that a low molecular weight additive such as a hydrocarbon resin is not enough to make a dramatic improvement in sealing properties. The proper modifying additive must preferably exhibit some elastomeric properties (which thermoplastic elastomers and plastomers do) and have an isothermal crystallinity temperature of less than 60° C.

Examples 1 and 2 (Ex 1 & 2) use 10 wt % and 5 wt % respectively of the Tafmer® XM7070 butene-propylene thermoplastic elastomer blended with 90 and 95 wt % of respectively of the propylene mini-random homopolymer PP4772 in the core layer. Haze appearance was excellent, being even slightly lower than the control film CEx. 1. This may be due to both good compatibility of the lower molecular weight thermoplastic elastomers and compatibilization between the modified core layer and heat seal resin interface which reduces internal haze. Heat seal strengths were significantly and dramatically improved over the control CEx. 1 and the other comparative examples. In particular, Ex. 1 demonstrated outstandingly improved heat seal strengths (over 1200 g/in (g/25 mm) at 250° F. (121° C.)), a surprisingly large improvement considering the small amount of thermoplastic elastomer added to the core and the thin heat sealable layer used.

Example 3 (Ex 3) uses 10 wt % of the core layer of the Tafmer® XM7080 propylene-butene thermoplastic elastomer blended with 90 wt % of the propylene mini-random homopolymer PP4772 in the core layer. Haze continues to be good and heat seal strength is significantly improved over the comparative examples.

Example 4 (Ex 4) uses 10 wt % of the core layer of the ethylene-propylene plastomer Versify® 3300 blended with 90 wt % of the propylene mini-random homopolymer PP4772 in the core layer. Haze continues to be good and heat seal strength is significantly improved over the comparative examples, although not as much as the thermoplastic elastomers.

Example 5 (Ex 5) uses 10 wt % of the core layer of the ethylene-propylene thermoplastic elastomer Vistamaxx® 3000 blended with 90 wt % of the propylene mini-random homopolymer PP4772 in the core layer. Haze continues to be good and heat seal strength is significantly improved over the comparative examples, although not as much as the propylene-butene-based thermoplastic elastomers.

Table 2 shows burst resistance testing of Ex. 1 vs. CEx. 1. As can be seen, Example 1 had nearly twice the burst resistance compared to Comparative Example 1. This illustrates the improvement in hermetic seal integrity and seal strength with the use of the modified core.

Table 3 shows puncture resistance testing of Ex. 1 vs. CEx. 1. As can be seen, Example 1 had significantly improved puncture resistance compare to Comparative Example 1 as indicated by the increase in force and energy required to puncture Ex. 1 compared to CEx. 1.

FIG. 2A shows seal strength comparisons over a range of sealing temperatures between only Examples 1 and 2 and the Comparative Examples for clarity. Examples 1 and 2 show significantly improved seal strength compared to the control film Comparative Example 1. The addition of 10 wt % thermoplastic elastomer to the core layer in Ex. 1 shows surprisingly high seal strengths far in excess of CEx. 1. The addition of 5 wt % elastomer to the core layer in Ex. 2 also shows a significantly higher seal strength over the temperature range of interest. The other comparative examples CEx. 2, 3, and 4, which use an EPB terpolymer, an EP copolymer, and a hydrocarbon resin, respectively, at 10 wt % in the core layer exhibit only incremental improvement in seal strengths over the temperature range of interest. Such improvement is not considered to be a significant one as compared to Ex. 1 and Ex. 2. The other Examples 3-5 show similar improvement as Example 2 as shown in FIG. 2B.

FIG. 3 shows hot tack strength comparisons between some of the Examples and Comparative Examples. Ex. 1, which uses 10 wt % of thermoplastic elastomer XM7070 in the core layer, exhibits significantly higher hot tack strengths as well as a lower hot tack initiation temperature as compared to the control film CEx. 1. Ex. 1 can achieve 150 g/in (g/25 mm) hot tack strength at a seal temperature of about 200° F. (93.3° C.) versus about 225° F. (107.2° C.) for CEx. 1. This is an improvement in hot tack initiation by ca. 25° F. (13.9° C.), which is significant. Ex. 2 also shows higher hot tack strengths than CEx. 1 and also shows a similar improvement in hot tack initiation (ca. 210° F. (98.9° C.)). The other comparative examples CEx. 2 and CEx. 3 which use an EPB terpolymer and EP copolymer, respectively, have the same or slightly higher hot tack strengths than the control CEx. 1. The hot tack initiation temperature for CEx. 2 and 3 are very similar to CEx. 1 and do not show any significant improvement in this regard.

Thus, of the foregoing Examples and Comparative Examples, only the inventive Examples, which used an amount of modifying butene-propylene or ethylene-propylene thermoplastic elastomers or plastomers blended with a crystalline propylene homopolymer in the core base layer, was effective in satisfying the requirements of high heat seal strength improvement, hermetic heat seal improvement, and puncture resistance improvement.

Test Methods

The various properties in the above examples were measured by the following methods:

Heat seal strength was measured by using a Sentinel sealer model 12 ASL at 20 psi (137.9 kPa), 0.5 second dwell time, with heated flat upper seal jaw Teflon coated, and unheated lower seal jaw, rubber with glass-cloth covered. The film sample is heat-sealed sealable-side to sealable-side at various desired seal temperatures in the Sentinel sealer (e.g. 250° F. or 121° C.) or at desired temperature increments (e.g. 10° F. or 5.56° C. increments) from 180° F. (82.2° C.) to 290° F. (143.3° C.) and then the respective seal strengths are measured using an Instron model 4201 tensile tester. The heat-sealed film samples are cut into 1-inch (25.4 mm) wide strips parallel to the machine direction of film orientation, the two unsealed tails placed in the upper and lower Instron clamps, and the sealed tail supported at a 90° angle to the two unsealed tails for a 90° T-peel test. The peak and average seal strength is recorded. The preferred peak value is minimum 600 g/in (g/25 mm) or more at 250° F. (121° C.) seal temperature.

Heat seal initiation temperature (SIT) was measured by using a Sentinel sealer model 12 ASL at 20 psi (137.9 kPa), 0.5 second dwell time, with heated flat upper seal jaw Teflon coated, and unheated lower seal jaw, rubber with glass-cloth covered. The film sample is heat-sealed sealable-side to sealable-side at various desired seal temperatures in the Sentinel sealer and then the respective seal strengths are measured using an Instron model 4201 tensile tester as discussed above for heat seal strength determination. The Seal Initiation Temperature is defined as the seal temperature at which the film demonstrated a minimum of 200 g/in (g/25 mm) heat seal strength. The preferred SIT value is maximum 190° F. (87.78° C.) or lower.

Transparency of the film was measured by measuring the haze of a single sheet of film using a hazemeter model like a BYK Gardner "Haze-Gard Plus®" substantially in accordance with ASTM D1003. Preferred values for haze was 3.5% maximum or lower.

Hot tack strength was measured by using a Lako Tool hot tack/sealer model SL10 at 30 psi (206.8 kPa), 0.5 second dwell time, with heated flat lower seal jaw Teflon coated, and unheated upper seal jaw and with delay set to 0 seconds. The film sample is cut into a strip (parallel to the machine direction of the oriented film) 13 inches long by 1 inch wide (330.2 mm×25.4 mm) and fitted into the Lako SL10 film holder. The film is then heat-sealed sealant-side to sealant-side at the desired seal temperature range and increments in the Lako sealer (e.g. 180-290° F. (82.2-143.3° C.) at 10° F. (5.56° C.) increments) and then the respective hot tack strengths are measured by the Lako SL10 sealer automatically. The peak hot tack strength is recorded. The preferred values for acceptable hot tack is 150 g/in (g/25 mm) or greater at 250° F. (121° C.) seal temperature.

Hot tack seal initiation temperature was measured by using the above Lako Tool SL10 hot tack sealer. Hot tack initiation temperature is the lowest temperature at which minimum 150 g/in (g/25 mm) hot tack is achieved. Initiation temperatures of 200° F. (93.3° C.) or less are preferred.

Isothermal crystallization temperature and time to crystallization peak was determined via differential scanning calorimetry (DSC) techniques. A TA Instruments DSC model Q1000 was used. Crystallization temperature of the resin sample was determined substantially in accordance with ASTM D3417-99. Once the crystallization temperature is determined, isothermal crystallization data is generated at temperatures near the crystallization temperature and the time to peak crystallization is recorded. The specimen resin is cooled to −40° C., held for 15 minutes, and then raised to 230° C., held for 5 minutes, and quickly cooled to the desired isothermal temperature and the time to crystallization peak recorded. This process is repeated for each desired isothermal temperature to develop the desired data.

Burst resistance was measured using a T. M. Electronics model BT-1000 burst/creep tester. Pouches were made of the film examples and the burst tester probe inserted into the pouch. Air pressure was set at 5 psi (34.5 kPa) and the pouch was inflated for 10 seconds at a flow rate of 20 standard cubic feet per hour (566.3 l/hr). The pressure at which the bag eventually burst was recorded.

Puncture resistance testing was measured substantially in accordance with ASTM F1306 test procedure and used a 3.2 mm hemispherical probe. The side of the test film structure where puncture was initiated was the heat sealable layer side.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. A biaxally oriented film comprising:
   a co-extruded heat sealable skin layer comprising one or more heat sealant resins; and
   a co-extruded core layer comprising crystalline propylene homopolymer having an isotactic content of about 90% or greater and a heat of crystallization of about 105-111 J/g, and about 5-15 wt % metallocene-catalyzed propylene-butene thermoplastic elastomer of about 20-40 wt % butene, ethylene-propylene plastomer of about 10-15 wt % ethylene, or metallocene-catalyzed ethylene-propylene thermoplastic elastomer of about 10-15 wt % ethylene, the thermoplastic elastomers and plastomer exhibit an isothermal crystallization temperature of 60°

C. or less, wherein the film is transparent, has a haze value of 1.9 to 3.1%, has a heat seal strength of 713 g/in to 1779 g/in at 250° F. seal temperature, and is heat-set or annealed to reduce film shrinkage effects.

2. The film of claim 1, wherein the heat sealable layer has a thickness of no more than 2 μm.

3. The film of claim 1, further comprising a second skin layer on a side of the core layer.

4. The film of claim 3, wherein the second skin layer comprises propylene homopolymer, propylene copolymers, propylene terpolymers, or polyethylene.

5. The film of claim 3, wherein the second skin layer is discharge treated.

6. A biaxally oriented film comprising:
a co-extruded heat sealable skin layer having a thickness of no more than 2 μm; and
a co-extruded core layer comprising crystalline propylene homopolymer having an isotactic content of about 90% or greater and a heat of crystallization of about 105-11 J/g, and:

a) about 5-15 wt % metallocene-catalyzed propylene-butene thermoplastic elastomer of about 20-40 wt % butene;

b) about 5-15 wt % ethylene-propylene plastomer of about 10-15 wt % ethylene; or c) about 5-15 wt % by weight of the core layer, of a metallocene-catalyzed ethylene-propylene thermoplastic elastomer of about 10-15 wt % ethylene, wherein the thermoplastic elastomers and plastomer exhibit an isothermal crystallization temperature of 60° C. or less and the film has a haze value of 1.9 to 3.1%, has a heat seal strength of 713 g/in to 1779 g/in at 250° F. seal temperature, and is heat-set or annealed to reduce film shrinkage effects.

7. The film of claim 6, further comprising a second skin layer on a side of the core layer opposite the heat sealable skin layer.

* * * * *